W. P. CROCKETT.
SKIVING MACHINE.
APPLICATION FILED NOV. 28, 1916.

1,349,119.

Patented Aug. 10, 1920.
6 SHEETS—SHEET 1.

WITNESS:
Robert F. Beck

INVENTOR
William P. Crockett
BY
F. W. Ostrom
ATTORNEY

W. P. CROCKETT.
SKIVING MACHINE.
APPLICATION FILED NOV. 28, 1916.

1,349,119.

Patented Aug. 10, 1920.
6 SHEETS—SHEET 3.

WITNESS:
Robert F. Beck

INVENTOR
William P. Crockett
BY
ATTORNEY

W. P. CROCKETT.
SKIVING MACHINE.
APPLICATION FILED NOV. 28, 1916.

1,349,119.

Patented Aug. 10, 1920.
6 SHEETS—SHEET 4.

WITNESS: Robert F. Beck

INVENTOR
William P. Crockett
BY
ATTORNEY

W. P. CROCKETT.
SKIVING MACHINE.
APPLICATION FILED NOV. 28, 1916.

1,349,119.

Patented Aug. 10, 1920.
6 SHEETS—SHEET 5.

WITNESS:
Robert F. Beck

INVENTOR
William P. Crockett
BY
ATTORNEY

W. P. CROCKETT.
SKIVING MACHINE.
APPLICATION FILED NOV. 28, 1916.

1,349,119.

Patented Aug. 10, 1920.
6 SHEETS—SHEET 6.

WITNESS:
Robert F. Beckt

INVENTOR
William P. Crockett
BY
ATTORNEY

UNITED STATES PATENT OFFICE.

WILLIAM P. CROCKETT, OF HARRISON, NEW JERSEY, ASSIGNOR TO THE SINGER MANUFACTURING COMPANY, A CORPORATION OF NEW JERSEY.

SKIVING-MACHINE.

1,349,119.        Specification of Letters Patent.     Patented Aug. 10, 1920.

Application filed November 28, 1916. Serial No. 133,853.

*To all whom it may concern:*

Be it known that I, WILLIAM P. CROCKETT, a subject of the King of the United Kingdom of Great Britain and Ireland, and resident of Harrison, in the county of Essex and State of New Jersey, have invented certain new and useful Improvements in Skiving-Machines, of which the following is a specification, reference being had therein to the accompanying drawings.

The present invention relates to improvements in machines adapted for skiving the edges of and for splitting leather and other materials common to the manufacture of shoes, pocket-books, traveling bags, book-binding, &c., and has for its object to provide improved means for effecting the operations common to the products of such class of machines, and to this end the invention includes improved means for feeding and for guiding the work, adjusting means, power transmitting, speed regulating and other improved features hereinafter fully described and set forth in the claims.

In the accompanying drawings illustrating the invention.

Referring to the figures 1 represents the machine frame provided with the bed-plate 2 upon which is mounted the standard 3 carrying the bracket-arm 4 having a transversely arranged extension 5 into the free end of which is mounted, capable of vertical movements, the presser-guide-foot carrying bar, later to be referred to.

6 represents the main or driving shaft journaled at one end in a suitable bearing formed in the bearing lug 7 of the pulley housing 8 formed integral with the frame 1, said shaft passing loosely through a suitable opening (not shown) in said frame and at its opposite end journaled in a suitable bearing formed in the lug 9 depending from the bed-plate and provided with a suitably secured driving shaft flange 10 into which is suitably secured driving pins, as 11, said driving shaft flange and a cap 12, the latter suitably secured to said bearing lug, acting to hold said main-shaft from accidental movement in the direction of its length, a belt pulley 13 suitably secured upon said main-shaft acting, through a suitable belt (not shown), to connect said main-shaft with the source of power through a suitable treadle controlled power transmitter (not shown), as is common to the operating of manually controlled intermittently actuated machines generally.

14 represents a cutter actuating shaft mounted in a carriage 15 provided with slide-members, as 17, tracking the slide-ways, as 18, suitably secured to the under side of the bed-plate, said carriage being provided with integrally formed arms 19 and 20, the latter provided with a strap 21 through which loosely passes the sleeve 22 surrounding the grinding disk driving shaft 23, the arm 19 being provided with a split strap 24 made adjustable through a screw 25 to maintain its desired sliding relationship with said sleeve.

Figures 5, 6, 11:
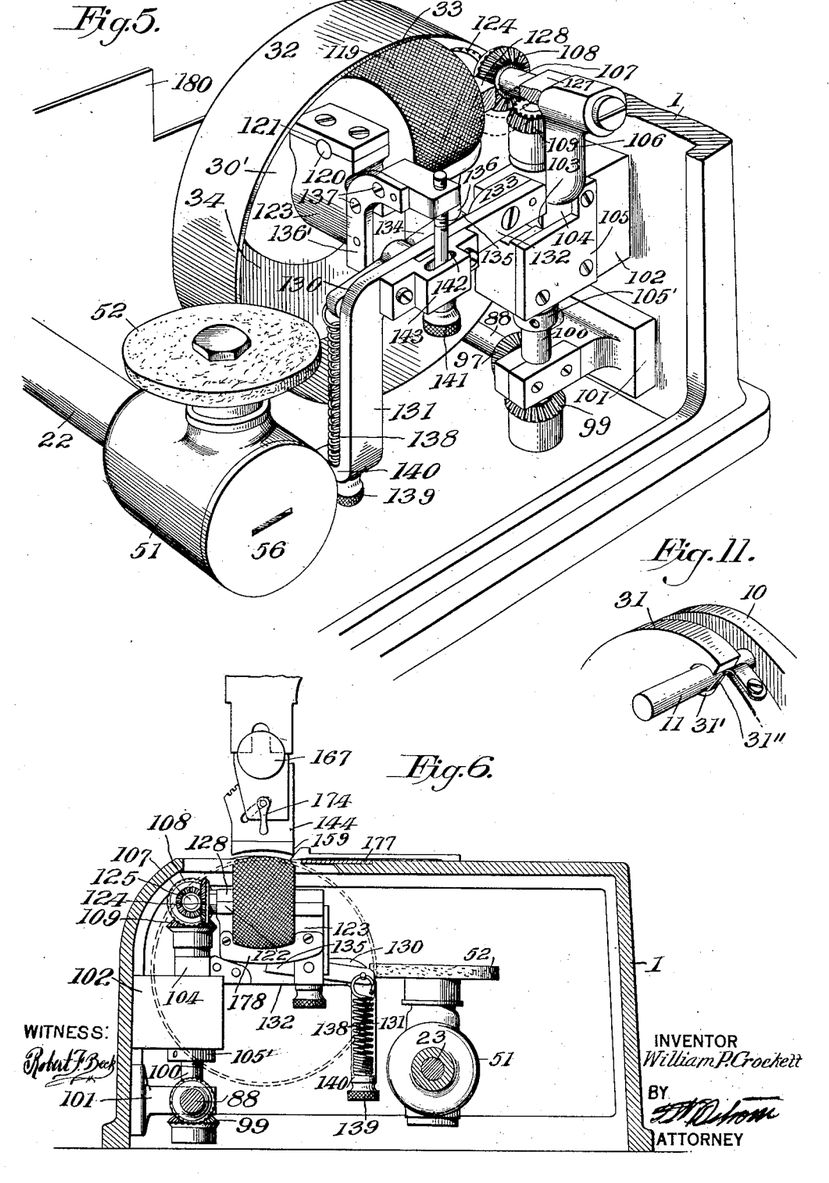
Fig. 5 is an enlarged view in perspective of the elements shown in Fig. 4 mounted below the machine bed-plate.
Figs. 6 and 7 are sectional views on the lines B—B and C—C respectively of Fig. 3 looking in the direction indicated by the respective arrows.
Fig. 11 is a view, in perspective, of a portion of the driving and driven flanges carried by the main-shaft and the cutter actuating shaft respectively.
Figure 7:
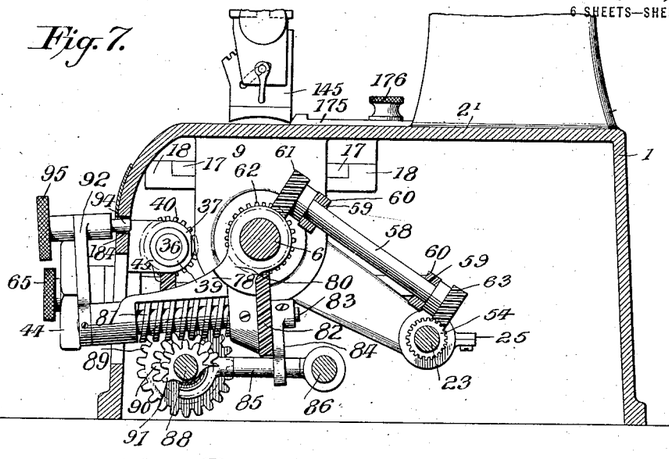
Figure 8:
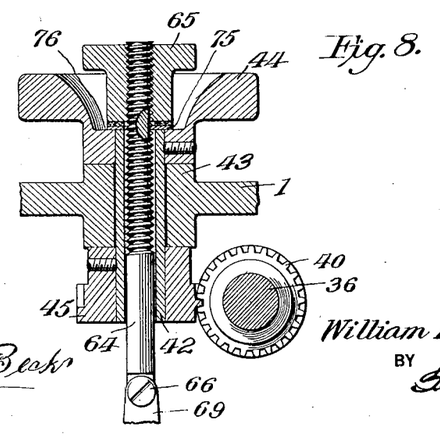
Fig. 8 is a view in central section on the line A—A of Fig. 2 illustrating the means for controlling the adjustments of the skiving knife with respect to the feeding mechanism and for controlling the effective action of the grinding disk.
Figures 9, 10:
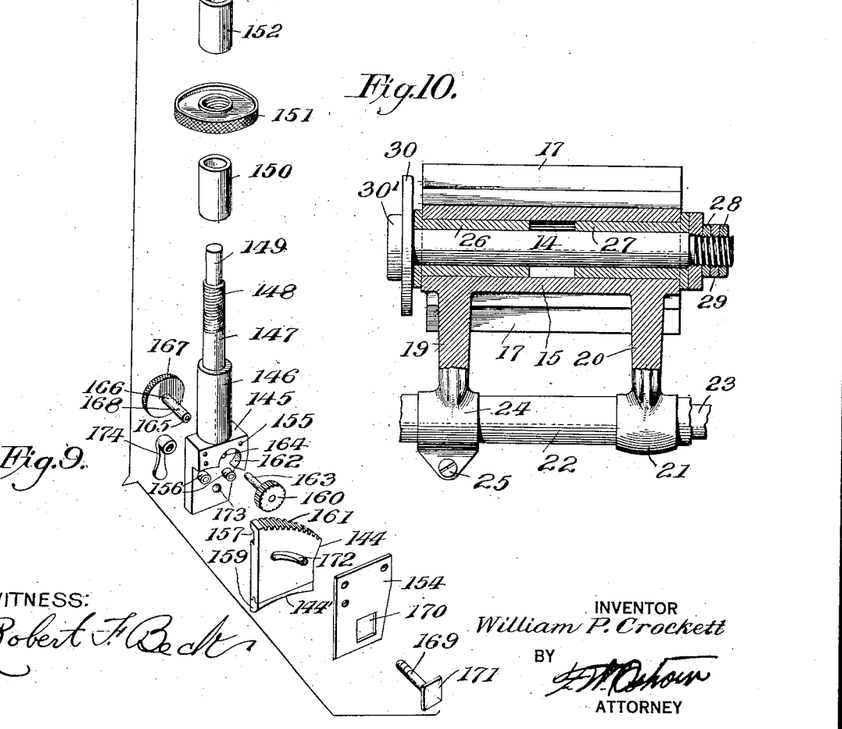
Fig. 9 comprises views, in perspective, of the elements comprising the presser-guide foot and the means for supporting the latter.
Fig. 10 is a view partly in full lines and partly in section of the cutter actuating shaft carriage, together with the cutter actuating shaft shown in full lines.

The cutter-actuating shaft 14 is journaled at one end in a bushing 26 and at its opposite end in a like bushing 27, the latter held against endwise movement by the jam-nuts, as 28, threaded onto said shaft and separated by a non-rotatable washer 29, the bushing 26 being held against endwise movement by the flange 30 suitably secured upon said shaft and provided with an integrally formed hub 30', the opposite end of the shaft 14 having suitably secured upon it a driven shaft flange 31 provided with suitable openings, as 31' (one only of which is shown, see Fig. 11), into which are slidably mounted the driving pins 11 controlled by springs, as 31'' (one only of which is shown) to, at all times, maintain their driving contact with the walls of said openings.

32 denotes a rotary cutter-head having an endless cutting edge 33 and whose base wall 34 is provided with a central opening which receives the hub 30' of the flange 30, said wall being secured to the latter by screws as 35 (one only of which is shown), thus transmitting from the main-shaft 6 rotary movements to said cutter head. 36 denotes a carriage adjusting screw journaled at one end in a suitable bearing formed in the lug 37 forming a part of the frame 1, and 38 a carriage-bracket into which said screw 36 is threaded and held against endwise movement by the suitably secured collar 39 and the hub of the spiral gear 40 fast on said shaft, said bracket being secured to the carriage by screws, as 41.

42 denotes a hollow shaft mounted to turn in a suitable bearing in the hub 43 formed integral with the frame 1 and onto said hollow shaft is suitably secured a hand-knob 44 and a spiral gear 45, the latter meshing with a gear 40 carried by the screw 36, thus effecting, through the rotary movements of the knob 44, rotary movements of the screw 36 which, through its threaded connection with the bracket 38, moves the carriage 15 and through the latter effects adjustments of the cutter relatively to the feeding and guiding mechanisms.

The grinding-disk driving shaft 23 is journaled at one end in a suitable bearing 47 formed in the frame 1 and for a considerable portion of its length in the sleeve 22 and carries at its forward end a beveled gear 48 meshing with a like gear member 49 carried by a grinding-disk shaft 50, which latter at its lower end is journaled in a suitable bearing formed in the gear housing 51 fast on the sleeve 22, the upper end of said disk shaft carrying the grinding-disk 52. The shaft 23 is held against endwise movement by a suitably secured collar 53 and gear member 54 and the sleeve 22 against like movement by the suitably secured collar 55 and gear member 48, a screw-cap 56 being provided for closing the threaded opening 57 in said housing. 58 denotes a gear driven and gear driving shaft journaled in bearings, as 59, formed in the lugs, as 60, forming a part of a suitable bearing bracket (not shown) secured to the frame 1, said shaft carrying at its upper end a gear member 61 meshing with a gear member 62, of greater diameter, carried by the main-shaft 6, the opposite end of the shaft 58 having fast upon it a gear member 63 meshing with the gear member 54, thus transmitting from the main-shaft 6 rotary movements to the grinding-disk driving shaft 23.

64 represents a grinding-disk adjusting rod slidably mounted in the hollow shaft 42 and threaded at one end to receive the knurled thumb-nut 65 and at its opposite end flattened and drilled to receive the bolt 66 secured by the nut 68, said bolt also passing through suitable openings in the forked end 69 of the sleeve adjusting connection 70, which latter at its opposite end is pivoted by screw 71 to a lug 72 forming part of a grinding-disk adjusting ring collar 73 secured by screws, as 74, on the sleeve 22, a non-rotatable washer 75 acting to separate the nut 65 from the bottom wall 76 of the knob 44, thus effecting through the adjustment of the nut 65 oscillatory movements of the sleeve 22 in opposition to the resiliency of the spring 77 to place the disk 52, through the connections pointed out, into and out of grinding relationship with the cutting edge 33 of the cutter head 32.

78 represents a gear carrying yoke provided with arms 79 and 80 arranged one at one side and the other at the opposite side of the gear member 62 and drilled to receive the main-shaft 6 upon which said yoke is mounted to oscillate, and into said yoke is journaled a tubular worm gear 81 carrying a spiral gear 82 meshing with the gear 62, thus transmitting from the main-shaft 6 rotary movements to said worm-gear. 83 denotes a gear adjusting rod journaled in said tubular worm-gear and carrying at one end a gear adjusting rod connection 84 forked at its free end to embrace a gear shifting connection 85 slidably connected at one end with a stud 86 secured in the frame 1, and at its opposite end forked to embrace a gear carrying sleeve 87 mounted to slide on and to rotate with a feed-shaft 88, said gear carrying sleeve having secured upon it the spiral gear members 89 and 90 and formed integral with it the gear member 91. 92 denotes a gear shifting crank fast on the outer end of the gear adjusting rod 83 and 93 a collar adjustably secured on the feed-shaft and acting to confine the amplitude of movement of the sleeve 87 between said collar and the frame 1 said gear shifting crank being provided with a spring plunger 94 having a knurled head 95.

The feed shaft 88, at its forward end, is journaled in a suitable bearing formed in a bracket 96 suitably secured to the frame 1 and at its opposite end in a suitable bearing formed in said frame, its forward end carrying a bevel gear 97 which, together with the suitably secured collar 98, holds said shaft against endwise movement. The gear 97 meshes with a like gear 99 fast on the lower end of a vertically arranged tubular shaft 100 mounted in a suitable bearing formed in the lug 101 rigid with the frame 1, said tubular shaft being held against endwise movement by the gear 99 and a suitable shoulder formed on the latter shaft by reducing its diameter for the length of its bearing surface. 102 denotes a bearing block suitably secured to the frame 1 and provided with a groove or guide-way 103 into which is slidably mounted the tubular post 104 held in sliding relationship with said groove by the suitably secured cap 105 and limited in its upward movement by the collar 105' threaded onto said post, which latter is provided with an integrally formed bracket 106 in which is journaled a gear-shaft 107 carrying a beveled gear 108 meshing with a like gear 109 fast on a vertically movable shaft 110, the lower end of the latter being provided with guide flanges, as 111, which track the grooves, as 112, in the tubular shaft 100 to effect a two-part telescopic rotary shaft, a spring 113 confined between the wall 106' of the bracket 106 and the upper end of the shaft 100 acting to hold said post and parts carried by it in their limit of upward movement controlled by the threaded collar 105'.

119 represents a feed-roller suitably secured on a shaft 120 journaled at one end in a bearing 121 and at its opposite end in a like bearing 122 in the feed-frame 123, said shaft having suitably secured to it a beveled gear 124 meshing with a beveled gear 125, of less diameter, carried by the shaft 107, thus transmitting from the main-shaft 6, through the connections pointed out, rotary movements to the feed-roller 119. 126 denotes a hinge-bracket the arm 127 of which is provided with a suitable opening through which passes the shaft 107, the arm 128 being suitably secured to the feed-frame 123 and comprises the cap for the bearing 122. 130 denotes a feed-adjusting frame comprising transversely arranged arms 131 and 132, the latter suitably secured to a bracket 133 carried by the post 104 and to the rear side of the arm 132 is suitably pivoted a rock-lever 134, the end 135 of which acts on a lug 136 of the bracket 136', the latter secured by screws as 137 to the feed-frame 123, in opposition to the resiliency of the spring 138 made adjustable by the thumb-screw 139 passing through the step 140 of the arm 131 and threaded into a suitable lug suitably secured in the lower end of said spring, the latter acting to resist the downward rocking movements of the feed-frame about the axis of the shaft 107 influenced by the variations in the thickness of the materials being acted on and to hold the latter up against the presser-guide-foot, later to be referred to. 141 denotes a feed-adjusting screw the reduced threaded portion of which passes through the opening 142 of the bracket 143 suitably secured to the arm 132, and at its upper end threaded into the free end of the bracket 136' to adjustably limit the upward rocking movement of said feed-frame.

From the foregoing it will be understood that the feed-roller and the elements for adjusting the latter are carried by the post 104, and that through the adjustment of the collar 105' said feed-roller and adjusting elements may be yieldingly secured in different selected positions and through the adjustments pointed out the axis of the feed-roller may be given adjustments oblique to a horizontal plane.

Figures 1, 12:
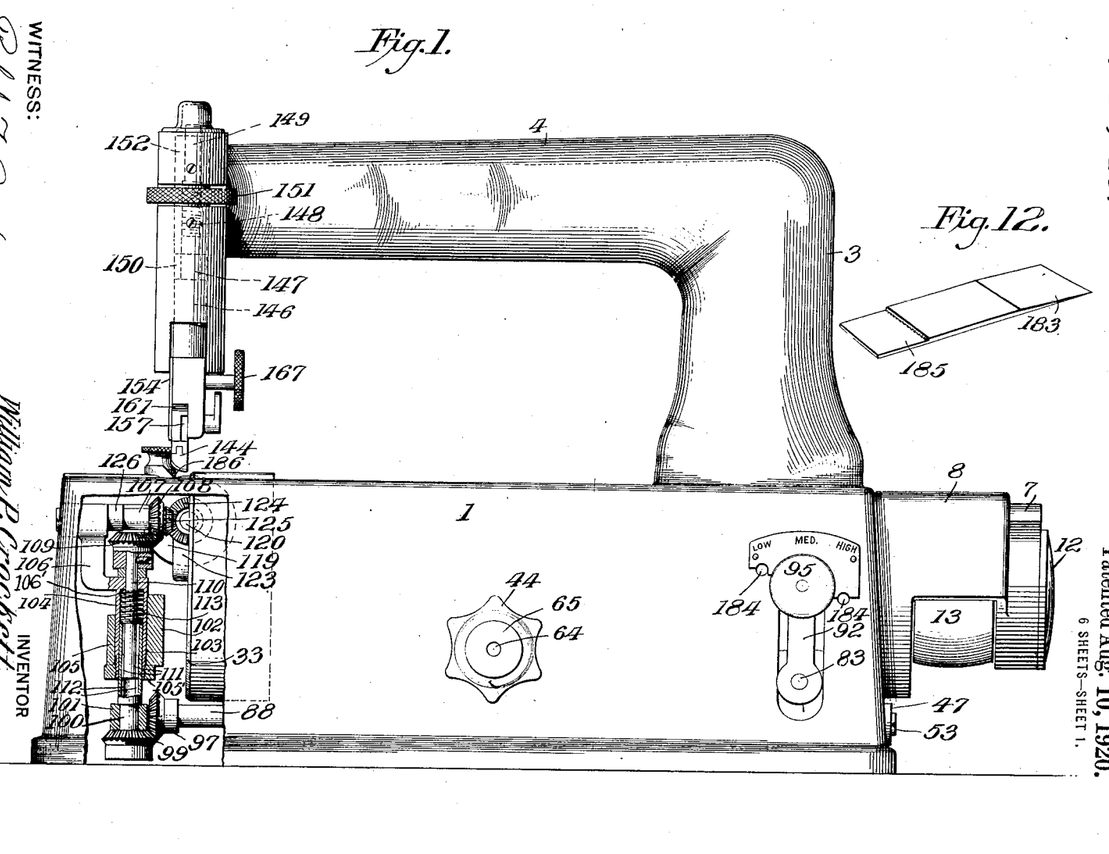
Figure 1 is a view in front side elevation of a skiving machine equipped with the present invention and Figs. 2, 3 and 4 are views in top plan, under side and front end elevation, respectively, of Fig. 1.
Fig. 12 is a view, in perspective, of a section of leather, one side of which represents a scarfed and the opposite side a split edge
Figure 2:
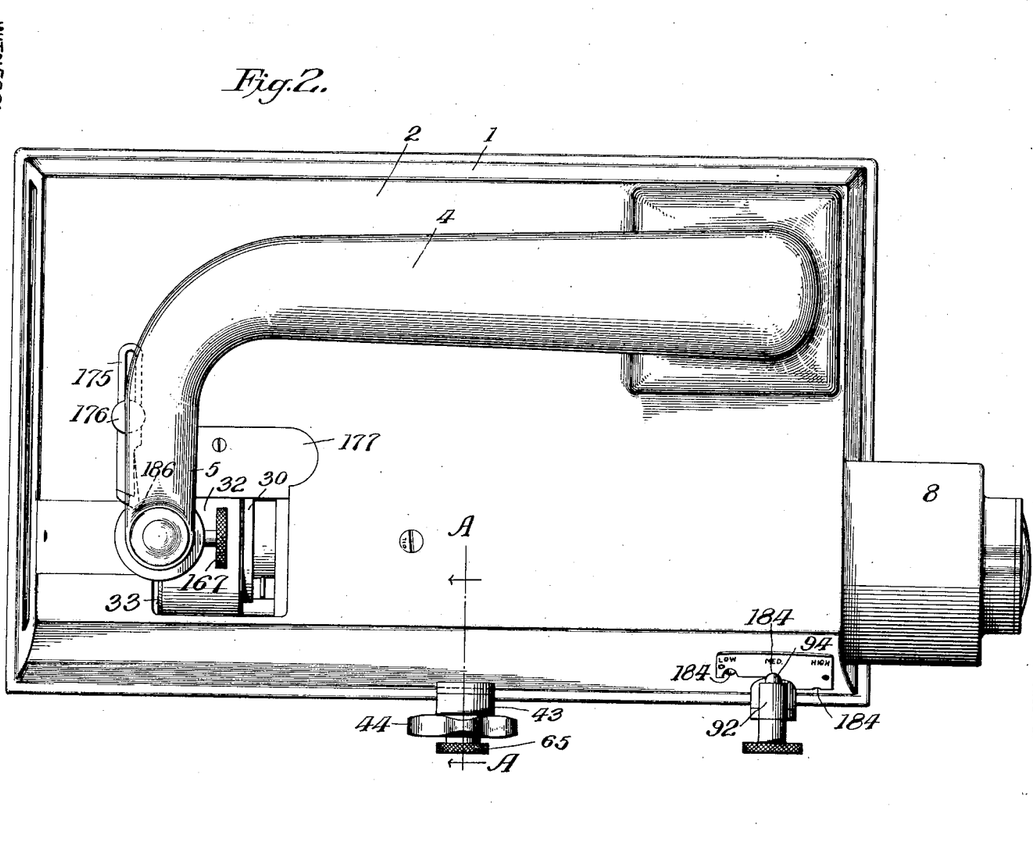
Figures 3, 13:
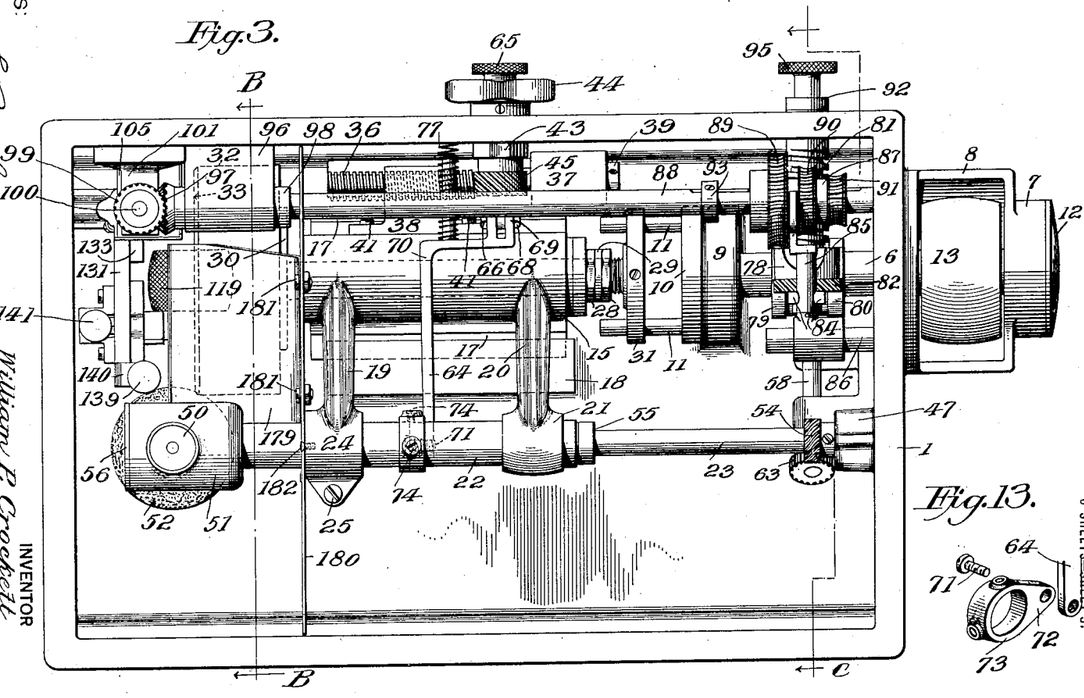
Fig. 13 is a view of the grinding disk adjusting collar.

144 represents the presser-guide-foot provided with the concaved guiding surface 144', 145 the presser-guide-foot bracket suitably secured to the lower end of the presser-guide-foot bar, the latter comprising a section 146 of greatest diameter, 147 of reduced diameter, threaded section 148 and section 149 of smallest diameter, the section 147 receiving the bushing 150, 148 the knurled nut 151 and section 149 the bushing 152. The elements above referred to are shown in Fig. 1 assembled and mounted in the head 153 of the bracket-arm 4 and from an inspection of said elements as shown in said figure it will be readily understood that through the manipulation of the nut 151 the presser-guide-foot bar is moved toward or away from the material being acted on as the nature of the product may require. The presser-guide-foot is secured in the bracket 145 by the plate 154 secured by suitable screws (not shown) threaded into the openings, as 155, in said bracket in position to cause the rollers, as 156, carried by said bracket, to track the groove 157 formed in said presser-guide-foot, said groove comprising a segment of a circle whose axis is represented by the extreme heel portion 159 of said presser-guide-foot. To effect adjustments of the presser-guide-foot about its axis there is provided a pinion 160 which meshes with the gear teeth 161 formed on the periphery of said presser-guide-foot, said pinion being mounted in a seat 162 in the bracket 145 and provided with a stem 163 journaled in a bearing 164 and entering the opening 165 of the hollow stem 166 having the knurled head 167, said stems being secured to turn together by a pin 168. To hold the presser-guide-foot against accidental movement about its axis 159 there is provided a bolt 169 which passes through the opening 170 in the plate 154 with the head 171 seated in the said opening, through the slot 172 in the presser-guide-foot, opening 173 in the bracket 145 and threaded into the crank-nut 174, which latter acts to secure said presser-guide-foot or release it to the action of said pinion as the circumstances may require.

175 represents an edge-gage adjustably secured to the bed-plate 1 by thumb-screw 176, 177 a guard-plate for preventing the material from being carried below the bed-plate as it is fed across the periphery of the cutter head, 178 a feed-roller guard suitably secured to the feed-frame for removing from the periphery of said feed-roller small particles of material incident to the skiving operation, 179 a chute for receiving and directing the trimmed off portion or scrap of the material away from and out of the interior of the cutter head and 180 a sheet-metal partition to which the chute is secured by screws as 181 said partition being secured to the strap 24 by screw 182 and suitably forked to straddle the knife-shaft 14, thus securing it to partake of the adjustments of the carriage 15 and parts carried by the latter.

It is believed that applicant is the first to employ a presser-guide-foot suspended about the machine bed-plate capable of oscillatory adjustments about an axis which latter, in practice, lies in substantially the same plane as the upper surface of the material, thus effecting oscillatory adjustments of said presser-guide-foot to meet the requirements of different widths of scarf and without changing its position laterally with respect to the apex of the convex surface of the periphery of the feed-roller, which gives to the present construction a wider range of application than can be accomplished by any construction known to applicant.

When it is desired to give to the edge of the material a beveled surface, as designated by 183, Fig. 12, the presser-guide-foot is adjusted relatively to the feed-roll with its concave surface sufficiently oblique to the longitudinal axis of said feed-roll to effect the desired width of scarf, the thickness of the free edge of the scarfed portion of the material being controlled by the vertical adjustments of said presser-guide-foot. The speed given the feed-roll is governed by the thickness and compactness of the material, and when it is desired to change the feeding action the operator withdraws the plunger 94 from engagement with one of the openings, as 184, and rocks the yoke 78 upwardly which moves the worm-gear 81 out of engagement with the last driven spiral gear, and through the crank-arm oscillates the rod 83 which, through the connections pointed out, brings into position for engagement by said worm-gear the spiral gear for effecting the desired feed action, when the plunger is positioned in the opening for retaining the combination of gear-drive last effective. It is to be understood that the resilient control of the feed-roll allows it to respond vertically and at an angle to the vertical to meet the requirement of unevenness and variations in compactness of the material.

Figure 4:
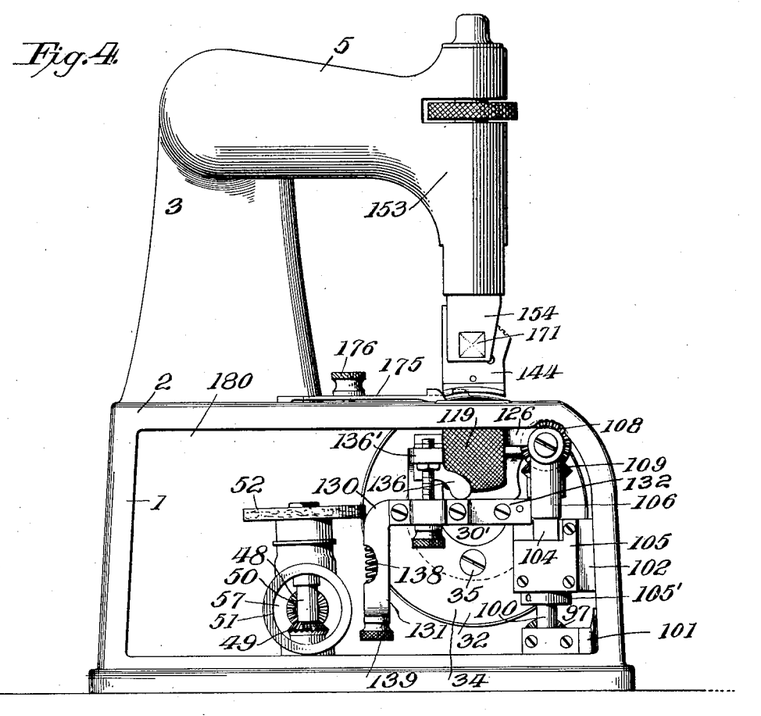

When it is desired to split the material back from its edge, as represented by 185, Fig. 12 the concave surface of the presser-guide-foot is adjusted parallel with the convex surface of the feed-roll with the guiding edge 186 of the edge-guide substantially central of the length of said concave surface, as shown in dotted lines, Fig. 4.

Having thus set forth the nature of the invention, what I claim herein is:—

1. A machine of the character described, having in combination a main-shaft, a cutter-head actuating shaft carrying a cutter head and operatively connected with said main-shaft, and a feeding mechanism operated from said main-shaft through connections including a feed actuating shaft carrying a multiple of spiral gears having sliding relationship therewith and a worm gear operatively connected with said main-shaft and manually controlled to transmit power to the spiral gear selected to best meet the feed requirements of the material being acted on.

2. A machine of the character described, having in combination a main-shaft, a cutter-head actuating shaft carrying a cutter-head and operatively connected with said main-shaft, a feeding mechanism operated from said main-shaft through connections including a feed actuating shaft carrying a multiple of spiral gears having sliding relationship therewith and a worm gear operatively connected with said main-shaft and manually controlled to transmit power to the spiral gear selected to best meet the feed requirements of the material being acted on, and means for holding said worm gear in driving relationship with said selected spiral gear except at the will of the operator.

3. A machine of the character described, having in combination a main-shaft, a cutter-head actuating shaft carrying a cutter-head and operatively connected with said main-shaft, and a feeding mechanism operated from said main-shaft through connections including a feed actuating shaft carrying a multiple of spiral gears having sliding relationship therewith, and a worm gear journaled in a gear carrying yoke having swinging movements about the axis of said main-shaft, said worm gear being provided with a gear member meshing with the gear member carried by said main-shaft, the worm gear and said multiple spiral gears being manually controlled to transmit to said feeding mechanism the feed action best calculated to meet the feed requirements of the material being acted on.

4. A machine of the character described, having in combination a main-shaft, a cutter-head actuating shaft carrying a cutter-head and operatively connected with said main-shaft, a feeding mechanism operated from said main-shaft through connections including a feed actuating shaft carrying a multiple of spiral gears having sliding relationship therewith, and a worm gear carried by a swinging yoke and operatively connected with said main-shaft, and a gear adjusting rod carried by said worm-gear and connected, through a gear shifting connection, with the sleeve carrying said multiple gear members, said worm gear and sleeve being manually controlled to transmit to said feeding mechanism the feed action best calculated to meet the requirements of the material being acted on.

5. A machine of the character described, having in combination a main-shaft, a cutter-head actuating shaft carrying a cutter-head and operatively connected with said main-shaft, and a feeding mechanism operated from said main-shaft through connections including a feed actuating shaft carrying a multiple of spiral gears having sliding relationship therewith, and a worm gear journaled in a gear carrying yoke having swinging movements about the axis of said main-shaft in a given plane only, said worm gear being provided with a gear member meshing with a gear member carried by said main-shaft, the worm gear and said multiple spiral gears being manually controlled to transmit to said feeding mechanism the feed action best calculated to meet the requirements of the material being acted on.

6. In a machine of the character described, the combination with a main-shaft and a cutter carrying shaft provided with a cutter, said latter shaft being driven from said main-shaft and adjustable in the direction of its length, of a feed-roll actuated from said main-shaft through connections including a worm gear operatively connected with the latter and a feed actuating shaft upon which is slidably mounted a sleeve provided with multiple gear members, said worm gear carrying a manually controlled gear adjusting rod acting, through a suitable connection, on a sliding connection to cause said sleeve to bring into engagement with said worm gear the gear member selected to meet the feed requirements of the work.

In testimony whereof I have signed my name to this specification.

WILLIAM P. CROCKETT.